3,344,098
METHOD OF MAKING A CHROMOGEN BONDED
POLYMER AND PRODUCTS THEREOF
Shojiro Horiguchi, Tokyo, and Michiei Nakamura,
Urawa-shi, Japan, assignors to Dainichiseika Color
& Chemicals Mfg. Co., Ltd., Tokyo, Japan, a corporation of Japan
No Drawing. Continuation of applications Ser. No.
232,614, Oct. 23, 1962, and Ser. No. 303,413, Aug.
20, 1963. This application Jan. 19, 1965, Ser. No.
427,215
Claims priority, application Japan, Oct. 31, 1961,
36/38,872; May 6, 1963, 38/22,546
33 Claims. (Cl. 260—22)

This invention relates to colored polymers. More particularly it relates to a method of making a novel chromogen-bonded-polymer and compounds made thereby.

This application is a continuation application of applications S.N. 232,614 entitled Method of Making Colored Resinous Compositions and Compositions Made Thereby filed October 23, 1962, now abandoned and S.N. 303,-413 entitled a New Reactive Coloring Matter, Processes For Producing the Same and Processes For Coloring Articles With the Same filed August 20, 1963.

Generally, paints, inks and coloring materials for textiles and synthetic resins are made by blending a pigment in dry powder form with solvents, varnishes, and/or plasticizers and the like and then dispersing the pigment in the liquid vehicle by wet grinding. However, the pigment particles tend to aggregate or flocculate several times during the drying process and to consequently form clusters with a resulting large pigment particle size. Accordingly, such large pigment particles are not readily dispersible leading to a low tinting strength thereof.

In an attempt to overcome the disadvantages presented by the aggregation and flocculation of the pigment particles during the drying process, the dispersion of the pigment in the dispersing vehicle has been improved by the addition of a surface active agent to the vehicle. However, such addition while possibly improving the pigment particle dispersion has produced undesirable phenomena such as migration.

In any event, since the pigment is merely dispersed in the vehicle such as in a resin or resin film, properties of the resin such as its abrasion resistance, hardness, etc., tend to be reduced and thereby tend to invite cracking and delamination.

Accordingly, it is an important object of this invention to provide a chromogen-bonded-polymer which is substantially different in chemical and physical properties from conventional pigment and dyes, which has high tinting strength and which is characterized by its good retention of mechanical and electrical properties.

It is another object to provide a method for making a chromogen-bonded-polymer in accordance with the preceding object.

In accordance with the invention, there is provided a method for making a chromogen-bonded-polymer which comprises the steps of mixing an addition-polymerizable monomer with a chromogen containing diazonium salt of a material selected from the group consisting of dyes, pigments and intermediates thereof and polymerizing the monomer by using as a polymerization initiator the diazonium salt to form the aforesaid chromogen-bonded-polymer. There is also provided in accordance with the invention, the chromogen-bonded-polymer produced by this method.

For a better understanding of the invention together with other and further objects thereof, reference is made to the following description and its scope will be pointed out in the appended claims.

Prior to describing the invention in its various particulars, it is to be realized that the chromogen-bonded-polymer of this invention is a chemical compound, i.e. the color forming groups, or chromogens, are chemically bonded directly to the polymer. Consequently, the dispersing properties and tinting strength thereof are especially good. In addition, their resistance to abrasion and their mechanical and electrical properties are also good.

Essentially, the method of preparing the chromogen-bonded-polymer comprises mixing a diazonium salt of a dye or a pigment or an intermediate thereof with monomers which are addition polymerizable and carrying out the polymerization by using as a polymerization initiator the diazonium salt, which is decomposed with foaming and acts as a polymerization initiator on the mixed monomer to form the chromogen-bonded-polymer.

The diazonium salts which may be used are prepared by diazotizing chromogen containing amino compounds. Pigment type chromogens, which are characterized by having no water-solubilizable radical in themselves and which are directly bonded to the polymer may suitably include such various well known pigments as phthalocyanine pigment, for example, copper phthalocyanine blue, copper phthalocyanine green, etc., indigo pigments, thioindigo pigments, anthraquinone pigments, perinone pigments, perylene pigments, dioxazine pigments, quinacridone pigments, the azo pigment series, such as azo coupling pigments, azo condensation pigments, sulfur pigments, basic lake pigments and the like. Dye type chromogens which have water-solubilizable radicals in themselves and which are directly bonded to the polymer may suitably include a chromogen containing a sulfonic acid radical or carboxylic acid radical on the above-mentioned pigment type chromogen.

Typical further compounds and classes included in the above may be tetra-amino copper phthalocyanine blue, tetra-amino chlorinated copper phthalocyanine green, tetra-amino linear quinacridone and the others in the quinacridone group; 1.4-diamino indanthrene and the others in the indanthrene group, 1-diazobenzene-2-hydroxynaphthoic acid-3'-amino-anilide and the others in the azo group, compounds containing a sulfonic group or carboxylic acid group on the above mentioned amino compounds. There are other types of amino compounds, which are intermediates of both types of the above-mentioned amino compounds, such other types being typified by those such as 2-hydroxynaphthoic acid-(3'-amino)-anilide. Further advantageously useful diazonium salts in preparing the chromogen-bonded-polymer in accordance with the invention are copper phthalocyanine blue-tetra-diazonium salt, chlorinated copper phthalocyanine green-tetra-diazonium salt, linear quinacridone tetra-diazonium salt, indanthrene-1, 4-tetra-zonium salt, 1-diazobenzene - 2 - hydroxynaphthoic acid anilide-3'-diazonium salt, 2-hydroxynaphthoic acid anilide-3'-diazonium salt, and the like.

The above detailed diazonium salts provide the chromogen portion for the chromogen-bonded-polymer.

Monomers that are addition polymerizable that can be used in the inventive process are, for example, vinyl acetate, vinyl chloride, vinylidine chloride, styrene, acrylonitrile, methyl vinyl ketone, methyl vinyl ether, vinyl pyrrolidone, vinyl pyridine, isobutylene, maleic acid, fumaric acid, acrylic acid, methacrylic acid and esters thereof, such as the methyl esters, glycidyl methacrylate, acrylamide, diaminovinyltriazine, N,N' - dimethyloldiaminovinyltriazine, N-methylol vinylurea, N-methylol acrylamide, and the like, monomers having conjugated double bonds such as butadiene, isoprene, and the like, or monomers having non-conjugated double bonds such as ethylene glycol diacrylate, diallyl phthalate, N,N'-methylene bis-acrylamide, and the like.

The above set forth monomers may generally be divided into two subgroups. A first subgroup thereof consists of a first division which consists of addition-polymerizable monomers which when polymerized form a polymer containing in its structure reactive radicals capable of linking with a functional group but incapable of cross-linking on itself, such first division suitably including monomers such as maleic acid, fumaric acid, acrylic acid, methacrylic acid, acrylamide, diaminovinyltriazine and vinylurea; and a second division which consists of addition-polymerizable monomers which when polymerized form a polymer containing in its structure reactive functional radicals capable of cross-linking with a functional group, such second division suitably including monomers such as N-methylol acrylamide, N,N'-dimethylol diaminovinyltriazine, N-methylol vinylurea, glycidyl methacrylate, allyl-glycidyl ether, diallylphthalate, ethyleneglyco diacrylate, diacrylmethane, and N,N'-methylene bis-acrylamide. A second subgroup thereof consists of addition-polymerizable monomers which are difficultly activated with reactive functional groups, such second subgroup suitably including monomers such as vinyl acetate, vinyl chloride, vinylidene chloride, styrene, acrylonitrile, methyl vinyl ketone, methyl vinyl ether, vinyl pyrrolidone, vinyl pyridine, isobutylene, methyl maleate, methyl fumarate, methyl acrylate, methyl methacrylate, ethyl maleate, ethyl fumarate, ethyl acrylate, ethyl methacrylate, butadiene and isoprene.

Diazonium salts of dyes, pigments or intermediates thereof as hereinbefore detailed may be mixed with the aforementioned addition-polymerizable monomers, and then the mixture is polymerized in a suitable manner to prepare polymers chemically bonded to the chromogen. Polymerization can be carried out by mixing one or more types of monomers without any regard to ratio of each type of monomer. The properties of the polymer portion in the chromogen-bonded-polymer are derived from those of the mixed monomers of various types, i.e., strongly reactive or non-reactive, or water or oil dispersible, also depending upon the ratio of each type of monomer. Such polymerization can be carried out by any of the known methods of addition-polymerization such as, solution-, block-, emulsion- and suspension-polymerizations. The chromogen-bonded-polymers, i.e. colored addition polymers, are useful by themselves and can also be employed as coloring agents for other materials.

Because, according to the invention, the chromogen is bonded directly to the polymer, the resulting chromogen-bonded-polymer has particularly good dispersing properties and tinting strength. In addition, the resistance toward abrasion is high and no migration is observed. Further, desired mechanical and electrical properties are substantially preserved.

Additionally, by using polymerizable monomers having functional, i.e. reactive radicals capable of giving a cross-linkage, such reactive radicals can be introduced into the chromogen-bonded-polymer.

The hereinbelow set forth tabulation is a list of examples of suitable reactive radicals:

| Names of Radicals | Structure |
|---|---|
| Methylol | $-CH_2OH$ |
| Epoxy | $-CH-CH_2$ with O bridge |
| Chlorohydrin | $-CH-CH_2$ with OH and Cl |
| Ethyleneimine | $-N$ with $CH_2$-$CH_2$ ring |
| Ethyleneurea | $-NHCON$ with $CH_2$-$CH_2$ ring |
| Acid chloride | $-COCl$ |
| Chlorotriazine | chlorotriazine ring structures |
| Ketene | $-CH=C=O$ |
| Vinyl | $-CH=CH_2$ |
| Isocyanate | $-N=C=O$ |
| Acid azide | $-CON_3$ |
| Phenylurethane | $-NHCOO-\text{C}_6\text{H}_5$ |
| Malonate added isocyanate | $-NHCOCH(COOR)_2$ |
| Sodium bisulfite added isocyanate (sodium sulphoisocyanate) | $-NHCOSO_3Na$ |

The monomers having the above-mentioned radicals (functional groups) for forming the chromogen-bonded-polymer having reactive (functional) radicals in their structures are in a very wide range. Substantially, the range includes the following large separate groups:

(1) Such cross-linkable monomers having methylol radicals which cause cross-linking when heated or when an acid catalyst is added, or derived radicals thereof, such as $-CH_2OR$ and $-CH_2SO_3Na$, as for example, N-methylolacrylamide, N,N'-dimethylol diaminovinyl triazine and N-methylol vinyl urea.

(2) Such cross-linkable monomers having epoxy or halohydrin radicals causing cross-linking when heated or when a basic catalyst or polycarboxylic acid is added, as for example, glycidyl methacrylate, allyl-glycidyl ether and the like.

(3) Such cross-linkable monomers which will be polymerized when heated or when a readily decomposable peroxide or diazo compound is added or a reducing agent is added as, for example, diallyl phthalate, ethyleneglycol diacrylate, diacrylmethane and N,N'-methylene-bis acrylamide.

This process in accordance with the invention for producing a chromogen-bonded-polymer having reactive radicals therein comprises introducing a diazonium radical into one of the dyes, pigments and intermediates thereof as mentioned hereinbefore and polymerizing one or more addition-polymerizable monomers containing one or more monomers having reactive radicals by using as a polymerization initiator the resulting diazonium compound of the chromogen.

With a chromogen-bonded-polymer having reactive radicals thereon, the fixing efficiency thereof may become especially enhanced when they are used for coloring. Thus, if an article to be colored is first treated with a dispersion of the polymer in a suitable vehicle and, after such treatment, is subjected to an after treatment such as heating, the addition of a catalyst or a heavy metal, or a variation of pH, the polymer is rendered insoluble. This is because the after treatment causes the reactive radicals to cross-link to a higher molecular weight, i.e., to higher polymer. Consequently, a film of higher polymer will present the advantages of greater resistance to solvents and chemicals; of being plasticized within, and thereby will have elasticity; and of being high in abrasion resistance and tensile strength whereby its life is greatly prolonged as to cracking and delamination.

The chromogen-bonded-polymer may also contain a reactive radical such as one of those listed in the hereinbelow tabulated group. These radicals may also function as dispersing or solubilizing radicals.

| Name of radicals: | Structure |
|---|---|
| Hydroxyl | —OH |
| Mercapto | —SH |
| Amino | —NH$_2$ |
| Imino | —NH— |
| Carboxyl | —COOH |
| Sulfo | —SO$_3$H |
| Carboamide | —CONH$_2$, —CONH— |
| Sulfoamide | —SO$_2$NH$_2$, —SO$_2$NH— |
| Urea | —NHCONH$_2$, NHCONH— |
| Ureido | —CONHCONH— |
| Urethane | —OCONH— |
| Methylene dicarbonyl | —COCH$_2$CO— |

However, if the polymer contains the aforementioned reactive radicals, which are in themselves solubilizable or dispersible, then the solubilizing or dispersible radical need not be included. For a hydrophilic radical solubilizable or dispersible in water, at least one polar radical is properly selected from anionic, nonionic and cationic hydrophilic radicals according to the object to be performed by the coloring matter. As typical thereof, there can be enumerated such anionic hydrophilic radicals as carboxyl (—COOH), sulfate (—OSO$_3$H) and sulfo (—SO$_3$H) radicals, such nonionic hydrophilic radicals as hydroxyl (—OH), ether (—O—) and carboamide (—CONH$_2$) radicals and such cationic hydrophilic radicals as amino (—NH$_2$), imino (—NH—), tertiary amino

and pyridine

radicals. For a hydrophobic radical solubilizable or dispersible in oil there is properly selected at least one non-polar group from aliphatic hydrocarbon radicals and esters, ether, carboamide, sulfoamide, urea and urethane condensates thereof according to the use desired of the aforesaid coloring matter.

Processes in accordance with the invention for making a chromogen-bonded-polymer having a hydrophilic or hydrophobic radical may include the following:

(1) Introduction of water-solubilizable or dispersible radicals.
 (A) Introduction of anionic hydrophilic radicals.
  (a) A carboxyl radical is introduced by using chloroacetic acid.
  (b) A sulfo radical is introduced by using sodium bisulfite.
  (c) A sulfonyl radical is introduced by using sulfamic acid.
 (B) Introduction of nonionic hydrophilic radicals.
  (a) A polyether type radical is introduced by using ethylene oxide.
  (b) A polyalcohol type radical is introduced by using glycerine or glycidol.
 (C) Introduction of cationic hydrophilic radicals.
  (a) An amino or imino radical is introduced by using a lower amine.
  (b) A pyridinium radical is introduced by using pyridine hydrochloride.
  (c) An amino radical is introduced by using ethylene imine.

(2) Introduction of oil-solubilizable or dispersible radicals.

By using a reactive compound having such hydrophobic hydrocarbon radical as, for example, a higher aliphatic, or aromatic-amine, -alcohol, -carboamide, -methylol carboamide, -isocyanate, -urea, -urethane or ethylene urea or a phenolic derivative, the aforesaid hydrocarbon radical is introduced.

The introduction of the solubilizing or dispersing radical into the chromogen-bonded-polymer enables it to be used in many different ways depending upon the nature of the radical introduced thereinto.

The chromogen-bonded-polymer of the present invention can be utilized for different uses depending on the kind of the solubilizable or dispersible radical contained therein, i.e., the chromogen-bonded-polymer into which there is introduced a hydophilic radical can be extensively utilized as a material similar to a dye in such conventional uses of dyes as dyeing fibrous materials. The polymer into which there is introduced a hydrophobic radical can be also extensively utilized, as a coloring material for paints and printing inks in the conventional uses of pigments.

This is because the chromogen-bonded-polymer of the invention, having in its structure radicals solubilizable or dispersible respectively in water, organic solvents, plasticizers or and other vehicles, can be easily dissolved or finely dispersed in such vehicles by merely being mixed and stirred therein. In the case of the chromogen-bonded-polymer having reactive radicals in its structure, when an after-treatment such as heating, addition of a catalyst or a heavy metal or variation of pH is carried out thereon, the reactive functional radicals of the polymer will be made to react with each other or with the vehicle so that the polymer may be cross-linked to be of a higher molecular weight. Thus, its resulting solubilizability or dispersibility will be so negligible as compared with the molecular weight of the cross-linked polymer that it will be able to be made insoluble.

The effects of coloring articles and materials with the chromogen-bonded-polymer having solubilizing or dispersing radicals as compared with those of conventional dyes and pigments is explained as follows.

The chromogen-bonded-polymers which have radicals solubilizable or dispersible in oil, for example, have such high dispersibility in solvents and varnishes that when they are utilized as a paint or ink, for example, they will be transparent, high in concentration and have good spreadability. If the polymers also have the aforesaid reactive radicals, the latter will cross link to each other or to a functional radical of an article being coated with the polymer upon an after treatment of the coated article. If the chromogen bonded polymer is used to color the interiors of synthethic resins and synthetic fibres and a dispersible radical high in compatibility with the resins and/or fibres is present in the bonded polymer, the latter polymer will be high in dispersibility and tinting strength, will cause no migration and will not deleteriously reduce the normal physical and electrical characteristics of such resins and fibres.

In coloring with conventional water-soluble coloring material such as known reactive dyes, the chromogens in these dyes are generally chosen to have a functional radical which is believed to covalently bond with a functional radical of the material, such as a fibrous substance, to be bonded to color the material. In this situation, a reactive dye which has been hydrolyzed with the water medium or a reactive dye which has lost its functional radicals through reaction with a sizing material, for example, will no longer be able to react with the material to be colored thereby reducing fastness of color. Futhermore, conventional dyes having a functional radical such as a sulfo or carboxyl radical in its chromogen, if not sufficiently applied to fabric materials, for example, will again dissolve or disperse in water when the dyed materials are washed and will stain white and light colored portions of the material. Even where sufficient dye has been applied, variations in pH or other conditions may result in a varying of the hue.

By contrast, when the chromogen-bonded-polymer produced in accordance with the invention has present therein reactive radicals and a radical solubilizable or dispersible in water and such polymer is caused to permeate materials such as fibrous materials in a state having affinity with water and then the reactive radicals are caused to cross-link with each other or to react with the functional radical or radicals of the materials in an after treatment of the materials coated with the chromogen-bonded-polymer such as by heating or a pH variation, the polymer will readily be cross-linked to a higher polymer. The resulting higher polymer is necessarily so insoluble and stable within the coated materials that, even if the materials are washed with hot water, acid or alkali, the color on the material remains fast. Thus it has been found that the cross-linked chromogen-bonded-polymer produced by the after treatment is so high in its fixing ratio, abrasion resistance and other characteristics of fastness that not only cotton, and other cellulose fibres such as viscose rayon and acetate rayon fibres but also wool and such synthetic fibres as polyester, polyamide, polyacrylonitrile and polyvinyl formal fibres can be uniformly dyed with it.

Where solutions for producing fibres, papers and nonwoven fabrics are colored with a conventional coloring material, dye, etc., the coloring material will act as an impurity and will deleteriously affect physical properties of the colored objects by reducing, for example, their tensile strength and tearing, bending and abrasion resistance. By contrast, the chromogen-bonded-polymer of the invention enhances such properties.

In addition, it has been found that when materials and articles such as papers, textiles, leathers, wooden articles, hard boards, concrete walls, metal plates, glass plates and the like are colored with the chromogen-bonded-polymer of the invention while simultaneously being resin treated, they are advantageously endowed with the desirable property of proof against stain and water, fire and moth damage.

The following examples will serve to illustrate the invention. However, it is to be understood that it is not intended to limit the scope of the invention thereto. The word "parts" appearing in the examples is intended to signify parts by weight.

*Example 1*

2.5 parts of tetra-(4)-amino copper phthalocyanine blue paste (the converted weight as the pigment purity) were thoroughly mixed with 15 parts of 30% hydrochloric acid aqueous solution, and the resulting solution then made up to 100 parts by the addition of water. This solution was kept at 0° to 5° C. in an ice-bath and diazotized for 30 minutes by adding 1.5 parts of sodium nitrite. After filtration, an aqueous solution of diazotized copper phthalocyanine blue was obtained.

A mixture was then formulated as follows:

| | Parts |
|---|---|
| An aqueous solution containing 2% diazotized copper phthalocyanine blue | 90 |
| Acrylamide | 7 |
| Methyl acrylate | 3 |
| Total | 100 |

When this solution was kept at the room temperature and then heated at 50° C. for 10 minutes, addition-polymerization occurred with the evolution of foams. The end point of the polymerization was fixed at a point where no coloration appears upon the addition of a naphthol AS alkaline solution to the above solution. After filtration, 200 parts of methanol were added to the filtrate to precipitate the chromogen-bonded-polymer. The thus-obtained chromogen-bonded-polymer was then dissolved in water and the hydrogen ion concentration of the aqueous solution was adjusted to the alkaline side by adding an aqueous solution of 5% $Na_2CO_3$. The polymer was then converted to the methylol compound by reacting therewith 2 parts of formaldehyde at 50° C. for 20 minutes. A chromogen-bonded-reactive-polymer solution was obtained.

The following components were then mixed together:

| | Parts |
|---|---|
| An aqueous solution containing 5% of the above-chromogen-bonded polymer | 35 |
| Polyethyleneglycol alkylether | 1 |
| Mineral spirits | 64 |
| Total | 100 |

The thus-formed mixture was vigorously stirred in a homogenizing mixer to prepare an oil-in-water type of emulsion for use as a textile printing paste.

This emulsion was printed on a cloth by means of a printing machine, dried on a steam cylinder and heated at 130° C. for five minutes in an air bath to obtain clear blue printed cloth having high resistibilities against abrasion, washing and solvent.

This example indicates the formation of a chromogen-bonded-polymer, the introducing into the polymer of a reactive radical, i.e., methylol and the subjection of a cloth coated with the reactive radical containing chromogen-bonded-polymer to an after treatment of heat to cause a higher polymerization.

*Example 2*

2.5 parts of tetra-(4-amino) copper phthalocyanine blue paste (measured by weight as the pure pigment) were thoroughly mixed with 15 parts of 30% aqueous hydrochloric acid solution and then made up to 100 parts by the addition of water. The solution was kept at 0° C. in an ice-bath and diazotized for 30 minutes by the addition of 1.5 parts of sodium nitrite. After filtration, an aqueous solution of diazotized copper phthalocyanine blue was obtained.

A mixture was then formulated as follows:

| | Parts |
|---|---|
| An aqueous solution containing 2% diazotized copper phthalocyanine blue | 90 |
| Acrylamide | 7 |
| Methyl acrylate | 3 |
| Total | 100 |

When this solution was kept 10 minutes at a room temperature and then at 50° C. for 20 minutes, polymerization occurred with continuous foaming. The end point of the polymerization was fixed at a point where no foaming occurred and a point where the color of the solution changed from greenish blue to sky-blue. After filtration, 250 parts aof methanol were added to the filtrate to precipitate the chromogen-bonded-polymer. By adding them in open air, blue polymer powder was obtained. This powder could be easily dissolved in water to form a clear blue solution.

5 parts of the blue polymer powder which were synthesized according to the method described above were dissolved in 95 parts of water to make a blue aqueous solution. 3 parts of formalin were added to it and methylolation was carried out at 65° C. for 25 minutes under the condition of pH 9 which was regulated by means of adding 5% aqueous sodium carbonate solution.

By adding 300 parts of methanol, a chromogen-bonded-polymer was obtained. This polymer was dried in an open air to obtain blue polymer powder. The blue polymer powder was quite soluble in water and clear blue aqueous solution was obtained.

This example is similar to that of Example 1.

*Example 3*

3 parts of unmethylolated blue chromogen-bonded-polymer synthesized according to the first portion of the method described in Example 2 were dissolved in 97 parts of water to make blue aqueous solution. A quantity of 0.5 parts of melamine and 5.4 parts of formalin were added to the solution. The pH of the solution was regulated to 7.5 by the addition of 5% aqueous sodium carbonate solution. Clear solution was obtained by then heating at 70° C. for 10 minutes.

After cooling the solution down to 45° C., 0.2 parts of sulfamic acid and 2.0 parts of 30% aqueous hydrochloric acid solution were added together to the above solution, and then by lowering the pH of the solution to 4.5, condensation occurred. After about 10 minutes, by taking a drop of reactant solution, the condensation degree was detected by dropping it into a large quantity of cold water and checking the point where a resinous precipitate would be formed.

Then 0.8 parts of 20% aqueous sodium hydroxide solution were added to the solution which made the pH of the reactant about 10, at which point blue chromogen-bonded-polymer solution was obtained. At this state of precipitation, nothing could be found when one drop of reactant was dropped into a large amount of cool water.

To a blue chromogen-bonded-polymer solution which was synthesized according to the method described in this example, 3 times its volume of methanol was added, whereby blue chromogen-bonded-polymer precipitate was obtained. This polymer precipitate was dissolved in water to dilute it to 5% by weight in aqueous solution.

According to the following composition, emulsion-polymerization was carried out at 55° C. for 1 hr., 65° C. for 4 hrs., and 80° C. for 2 hrs., with a continuous agitation and heating, and thus colored latex was obtained.

| | Parts |
|---|---|
| Blue colored polymer solution mentioned above | 75.0 |
| Butyl acrylate | 9.5 |
| Vinyl acetate | 1.5 |
| Vinylidene chloride | 9.0 |
| Acrylamide | 0.2 |
| Sodium phosphate | 0.5 |
| Sodium alkyl benzene sulfonate | 0.5 |
| Potassium persulfate | 0.04 |
| Water | 3.76 |
| Total | 100.00 |

Similar colored latex was also obtained using the blue chromogen-polymer solution which was synthesized according to Example 2 instead of this example.

This example shows the production of a chromogen-bonded-polymer which is both methylolated to be reactive and has introduced thereinto a water solubilizable sulfo radical by the use of sulfamic acid. In addition, it illustrates the production of a colored latex comprising mixing a reactive solubilizable chromogen-bonded-polymer with addition-polymerizable monomers and polymerization initiator, and polymerizing these monomers in aqueous solution of the chromogen-bonded-polymer.

*Example 4*

5 parts of unmethylolated chromogen-bonded-polymer which was synthesized according to the method described in the first portion of the method of Example 2 were dissolved in 95 parts of water to give a blue colored resinous aqueous solution. 10 parts of melamine and 43 parts of formalin were added to the colored solution. Methylolation reaction was carried out at 70° C. after the pH of the reactant was regulated with 5% aqueous sodium carbonate solution to 7.5. After the complete dissolution was achieved by the addition of 50 parts of butanol and 1 part of phosphoric acid, dehydration reaction was carried out at 90° C. by circulating the butanol and water, which was stripped off and collected from the reactant. After the reaction was completed, by taking off the excess butanol under a reduced pressure, and by concentrating the reactant to a viscous solution containing 80% of solid content, butyl-methylol-melamine type blue resinous solution was obtained.

*Example 5*

A mixture was prepared in accordance with the following formulation:

| | Parts |
|---|---|
| Methyl acrylate | 4 |
| Glycidyl methacrylate | 2 |
| N-vinyl pyrrolidone | 8 |
| Ethyleneglycol monomethylether | 6 |
| Total | 20 |

Into the thus-obtained mixture, 80 parts of an aqueous solution containing 2% of diazotized copper phthalocyanine blue, as explained in Example 1, was added dropwise with stirring and simultaneously the hydrogen ion concentration of this solution was adjusted toward the slightly acid side of neutral with an aqueous solution of 5% $Na_2CO_3$. Then, the resulting mixture was kept at room temperature for about 10 minutes and thereafter heated at 50° C. for 20 minutes to carry out the polymerization. After the neutralization of this solution, a chromogen-bonded-polymer was separated by adding 500 parts of methanol.

An aqueous solution containing 20% of the resulting polymer was prepared by adding water to the polymer. The thus-formed chromogen-bonded-polymer solution had very excellent adhesive properties. In a mixture consisting of 15 parts of the above solution and 85 parts of a latex containing a copolymer of acrylonitrile and butadiene, a random web of nylon was soaked, pressed by a mangle and then dried in a cloth shape to obtain a colored non-woven cloth.

This example also illustrates the process for producing a chromogen-bonded-polymer to which there is added a latex.

*Example 6*

In the same manner as described in Example 1, tetra-(4)-amino copper phthalocyanine green was diazotized to obtain an aqueous solution of the resulting diazonium salt. Separately, an aqueous emulsion of styrene was prepared in accordance with the following formulation:

| | Parts |
|---|---|
| Styrene | 40 |
| Polyethyleneglycol alkylether | 2 |
| Water | 58 |
| Total | 100 |

To this emulsion, 100 parts of an aqueous solution containing 2% of diazotized copper phthalocyanine green were added, kept at room temperature for 30 minutes and then heated at 50° C. for 60 minutes to carry out the polymerization. The thus-formed chromogen-bonded-polymer was separated by the addition of 300 parts of methanol, washed and dried to obtain a powder.

In a conventional pressurized molding machine, a molded polystyrene product colored uniformly green was produced from the above colored resin.

This example illustrates the process of producing a chromogen-bonded-polymer having non-reactive radicals.

Example 7

Tetra-(4-amino) copper phthalocyanine green was diazotized according to the method of Example 2. An emulsion was prepared according to the following composition with a strong agitation.

| | Parts |
|---|---|
| Methylmethacrylate | 13 |
| Ethylacrylate | 5 |
| Glycidylmethacrylate | 2 |
| Water | 80 |
| Total | 100 |

To the thus obtained emulsion, 100 parts of 2% aqueous solution of diazotized copper phthalocyanine green were added and polymerization was carried out for 10 minutes at a room temperature, at 50° C. for 2 hrs. and then at 60° C. for 2 hrs. By adding 500 parts of methanol to the polymerization solution, chromogen-bonded-polymer was precipitated. After washing and drying the precipitate, polymer powder was obtained. This powder was quite soluble in esters, ketones and the solution was a very clear green.

25 parts of glycerine were reacted together with 190 parts of linseed oil in a reaction vessel at 180° C. for 2 hrs. under the circulation of nitrogen gas. 0.2 parts of zinc acetate and 10 parts of green polymer powder synthesized according to the method of this example were added in the form of 60% of xylene solution to the above reaction mixture.

Elevating the temperature to 140° C., gradually, and stripping off the mixed vapour of alcohol and xylene, reaction was carried out. The reaction was then carried out for 30 minutes at 200° C. and thereafter was continued for 4 hrs. at 230 to 250° C. with the addition of 60 parts of phthalic acid. A viscous, alkyd type green solution was obtained.

This example illustrates the formation of a viscous alkyd type chromogen-bonded-polymer having weak reactive radicals, which are stable at room temperature and react with each other at high temperature, i.e., carboxyl and hydroxyl radicals, and hydrophobic radicals, i.e., aryl and aliphatic hydrocarbon radicals.

Example 8

Styrene monomer was dispersed in the form of an aqueous emulsion as follows:

| | Parts |
|---|---|
| Styrene | 50 |
| Polyethyleneglycol alkylether | 1 |
| Water | 49 |
| Total | 100 |

60 parts of an aqueous solution containing 2% of diazotized copper phthalocyanine green as shown in Example 6 were added to the above emulsion. Then, the mixture was kept at room temperature for 30 minutes and thereafter heated at 50° C. for 20 minutes to carry out the polymerization.

After the polymerization, 200 parts of methanol were added to it to separate the chromogen-bonded-polymer, which was then washed and dried. Chromogen-bonded-polymer powder was obtained.

The thus-obtained polymer was used in a manner as follows:

| | Parts |
|---|---|
| Polystyrene chip | 80 |
| The above-chromogen-bonded-polymer | 20 |
| Total | 100 |

The mixture was well mixed by a tumbler and polystyrene mold colored uniformly green was obtained by feeding the mixture into a pressurized molding machine.

This example also illustrates the production of a chromogen-bonded-polymer having non-reactive and dispersible radicals and its use as a coloring moldable material.

While there have been described what are considered to be the preferred embodiments of the invention, it will be obvious to those skilled in the art that various changes and modifications may be made therein without departing from the invention and it is, therefore, aimed to cover all such changes and modifications as fall within the true spirit and scope of the invention.

What is claimed is:

1. A method of making a chromogen-bonded-polymer which comprises mixing at least one ethylenically unsaturated polymerizable monomer selected from the group consisting of a first division consisting of ethylenically unsaturated polymerizable monomers which, when polymerized, form a polymer containing in its structure reactive radicals capable of linking with a functional group but incapable of cross-linking on themselves under ordinary curing conditions and a second division consisting of ethylenically unsaturated polymerizable monomers which, when polymerized, form a polymer containing in its structure reactive functional radicals and capable of cross-linking on themselves to form a higher polymer and capable of linking with a functional group of a material colored by said polymer, and a second subgroup consisting of ethylenically unsaturated polymerizable monomers which, when polymerized, for a polymer containing in its structure non-reactive radicals incapable of linking either with themselves or with a compound having functional groups under ordinary curing conditions with at least one species of the diazonium salt of a chromogen selected from the group consisting of a first subgroup consisting of amino derivatives of phthalocyanine pigments, quinacridone, indanthrene pigments, azo coupling pigments, compounds containing a sulfonic group on said amino derivatives, compounds containing a carboxylic acid group on said amino derivatives and a second subgroup consisting of amino derivatives of thioindigo, anthroquinone, perinone, perylene, dioxazine, azo condensation, sulfur and basic lake pigments and polymerizing said monomer, said diazonium salt of said chromogen being used as the initiator of said polymerization to form said chromogen-bonded-polymer.

2. A method as defined in claim 1 wherein said first subgroup of amino derivatives consists of tetra-amino copper phthalocyanine blue, tetra-amino copper phthalocyanine green, tetra-amino linear quinacridone, 1-diazobenzene-2-hydroxynaphtholic-3'-amino-anilide and 2 - hydroxynaphthoic acid-2'-amino-anilide.

3. A method as defined in claim 1 wherein said first division of said first group of ethylenically unsaturated polymerizable monomers consists of monomers containing in their structures reactive radicals selected from the group consisting of hydroxy, mercapto, amino, imino, carboxyl, sulfo, carboamide, sulfoamide, urea, ureido, urethano and methylene dicarbonyl radicals.

4. A method as defined in claim 3 wherein said first division of said first group of ethylenically unsaturated polymerizable monomers consists of maleic acid, fumaric acid, acrylic acid, methacrylic acid, acrylamide, diaminovinyltriazine and vinyl urea.

5. A method as defined in claim 1 wherein said second division of said first subgroup of ethylenically unsaturated monomers consists of monomers containing in their structures reactive functional radicals selected from the group consisting of methylol, epoxy, chlorohydrin, ethyleneimine, ethyleneurea, acid chloride, chlorotriazine, ketene, vinyl, isocyanate, phenylurethane, malonate added isocyanate and sodium sulfoisocyanate radicals.

6. A method as defined in claim 5 wherein said second division of said first subgroup of ethylenically unsaturated polymerizable monomers consists of N-methylol acrylamide, N,N'-dimethylol diaminovinyl triazine, N- methylol vinyl urea, glycidyl methacrylate, allyl glycidyl ether, diallylphthalate, ethyleneglycol diacrylate, diacrylmethane and N,N'-methylene-bis-acrylamide.

7. A method as defined in claim 1 wherein said second subgroup of ethylenically unsaturable monomers consists of vinyl acetate, vinyl chloride, vinylidene, chloride, styrene acrylonitrile, methyl vinyl ketone, methyl vinyl ether, vinyl pyrrolidone, vinyl pyridine, isobutylene, methyl maleate, methyl fumarate, methyl acrylate, methyl methacrylate, ethyl maleate, ethyl fumarate, ethyl acrylate, ethyl methacrylate, butadiene and isoprene.

8. A method as defined in claim 1 and further including the step of reacting the chromogen-bonded-polymer with materials containing in their structure reactive functional radicals capable of cross-linking to form a higher polymer and of linking with a functional radical of a material colored by said polymer to form a chromogen-bonded-polymer having said reactive radicals in its structure.

9. A method as defined in claim 1 and further including the step of reacting said chromogen-bonded-polymer with materials containing solubilizing and dispersing radicals in their structures to produce a chromogen-bonded-polymer having said solubilizing and dispersing radicals in its structure.

10. A method as defined in claim 9 wherein said last named materials are materials capable of introducing into a chromogen-bonded-polymer solubilizing and dispersing radicals selected from the group consisting of carboxyl, sulfate, sulfo, hydroxyl, ether, carboamide, amino, imino, tertiary, amino, pyridine radicals, aliphatic hydrocarbon radicals having 2 to 18 carbon atoms, aromatic and cyclic hydrocarbon radicals.

11. A method of making a chromogen-bonded-polymer which comprises mixing diazotized tetra-(4-amino) copper phthalocyanine blue with methyl acrylate and acrylamide and copolymerizing said acrylamide and methyl acrylate to produce said chromogen-bonded-polymer using said diazotized copper phthalocyanine blue as the polymerization initiator.

12. A method of making a chromogen-bonded-polymer having a methylol radical in its structure which comprises mixing diazotized tetra-(4-amino) copper phthalocyanine blue with methyl acrylate and acrylamide, copolymerizing said acrylamide and methyl acrylate said daizotized copper phthalocyanine blue being used as the polymerization initiator and reacting the chromogen-bonded-polymer resulting from said polymerization with formaldehyde to introduce the methylol radical into the structure of said polymer.

13. A method of making a chromogen-bonded-polymer which comprises mixing diazotized tetra-(4-amino) copper phthalocyanine blue with methyl acrylate and acrylamide, copolymerizing said acrylamide and methyl acrylate said diazotized copper phthalocyanine blue being used as the polymerization initiator, reacting the chromogen-bonded-polymer resulting from said polymerization with melamine and formaldehyde to introduce the methylol radical into the structure of said polymer and reacting said methylolated polymer with butanol to produce a butyl-methylol-melamine chromogen-bonded-polymer.

14. A method of making a chromogen-bonded-polymer having methylol and sulfo radicals in its structure comprising mixing diazotized tetra-(4-amino) copper phthalocyanine blue with acrylamide and methyl acrylate, copolymerizing said acrylamide and methyl acrylate said diazotized copper phthalocyanine blue being used as the polymerization initiator, reacting the chromogen-bonded-polymer resulting from said polymerization with formaldehyde and melamine to introduce said methylol radical into the structure of said polymer, and reacting said methylolated polymer with sulfamic acid to produce said chromogen-bonded-polymer having said methylol and sulfo radicals in its structure.

15. A method of making a chromogen-bonded-polymer comprising mixing diazotized tetra-(4-amino) copper phthalocyanine blue with methyl acrylate, glycidyl methacrylate, N-vinyl pyrrolidone and ethylene glycol monomethylether and copolymerizing said methyl acrylate, glycidyl methacrylate and N-vinyl pyrrolidone said diazotized copper phthalocyanine blue being used as the polymerization initiator to produce said chromogen-bonded-polymer.

16. A method of making a chromogen-bonded-polymer comprising mixing diazotized tetra-(4-amino) copper phthalocyanine blue with methyl acrylate, glycidyl methacrylate, N-vinyl pyrrolidone and ethylene glycol monomethylether, copolymerizing said methyl acrylate, glycidyl methacrylate ethylene glycol monomethyl ether and N-vinyl pyrrolidone said diazotized copper phthalocyanine blue being used as the polymerization initiator to produce said chromogen-bonded-polymer and mixing a solution of said polymer with a latex containing a copolymer of acrylonitrile and butadiene.

17. A method of making a latex containing a chromogen-bonded-polymer having methylol (and sulfo) radicals in its structure comprising mixing diazotized tetra-(4-amino) copper phthalocyanine blue with acrylamide and methyl acrylate, copolymerizing said acrylamide and methyl acrylate said diazotized copper phthalocyanine blue being used as the polymerization initiator, reacting the chromogen-bonded-polymer resulting from said polymerization with formaldehyde to introduce said methylol radical into the structure of said polymer and mixing an aqueous solution of said polymer with butyl acrylate, vinyl acetate, vinylidene chloride and acrylamide and polymerizing said monomers to obtain said latex.

18. A method of making a chromogen-bonded-polymer which comprises mixing diazotized tetra-(4-amino) copper phthalocyanine blue with styrene said diazotized copper phthalocyanine blue being used as the polymerization initiator and polymerizing said styrene to produce said chromogen-bonded-polymer.

19. A method of making a chromogen-bonded-polymer which comprises mixing diazotized tetra-(4-amino) copper phthalocyanine green with styrene said diazotized copper phthalocyanine green being used as the polymerization initiator and polymerizing said styrene to produce said chromogen-bonded-polymer.

20. A method of making a chromogen-bonded-polymer comprising mixing diazotized tetra-(4-amino) copper phthalocyanine green with methylmethacrylate, ethylacrylate and glycidyl methyl methacrylate and copolmerizing said methylmethacrylate, ethylacrylate and glycidyl methacrylate said diazotized copper phthalocyanine green being used as the polymerization initiator to produce said chromogen-bonded-polymer.

21. A method of making a chromogen-bonded-polymer comprising mixing diazotized tetra-(4-amino) copper phthalocyanine green with methylmethacrylate, ethylacrylate and glycidyl methacrylate, copolymerizing said methylmethacrylate, ethylacrylate and glycidyl methacrylate said diazotized copper phthalocyanine green being used as the polymerization initiator to form said chromogen-bonded-polymer and reacting said polymer with glycerine, linseed oil and phthalic acid to produce an alkyd resin type solution of said polymer.

22. The chromogen-bonded-polymer as produced by the method of claim 1.

23. The chromogen-bonded-polymer produced by the method of claim 11.

24. The chromogen-bonded-polymer produced by the method of claim 12.

25. The chromogen-bonded-polymer produced by the method of claim 13.

26. The chromogen-bonded-polymer produced by the method of claim 14.
27. The chromogen-bonded-polymer produced by the method of claim 15.
28. The chromogen-bonded-polymer produced by the method of claim 16.
29. The chromogen-bonded-polymer produced by the method of claim 17.
30. The chromogen-bonded-polymer produced by the method of claim 18.
31. The chromogen-bonded-polymer produced by the method of claim 19.
32. The chromogen-bonded-polymer produced by the method of claim 20.
33. The chromogen-bonded-polymer produced by the method of claim 21.

References Cited

UNITED STATES PATENTS

| | | | |
|---|---|---|---|
| 2,177,637 | 10/1939 | Coffman | 260—78 |
| 2,500,023 | 3/1950 | Burk | 260—41 |
| 2,988,544 | 6/1961 | Frey et al. | 260—41 |
| 3,127,390 | 3/1964 | Mueller et al. | 260—41 |
| 3,133,893 | 5/1964 | Newman | 260—41 |
| 3,137,671 | 6/1964 | Bosshard et al. | 260—41 |
| 3,177,214 | 4/1965 | Sulzer et al. | 260—249 |
| 3,183,208 | 5/1965 | Jurgeleit | 260—41 |
| 3,190,896 | 6/1965 | Skoultchi et al. | 260—41 |

DONALD E. CZAJA, *Primary Examiner.*

LEON J. BERCOVITZ, *Examiner.*

R. W. GRIFFIN, *Assistant Examiner.*